(12) United States Patent
Eipper et al.

(10) Patent No.: US 8,445,576 B2
(45) Date of Patent: May 21, 2013

(54) CONTINUOUS PROCESS FOR PREPARING POLYALKYLENE ARYLATES WITH HYPERBRANCHED POLYESTERS AND/OR POLYCARBONATES

(75) Inventors: Andreas Eipper, Ludwigshafen (DE); Bernd Bruchmann, Freinsheim (DE); Carsten Weiβ, Ludwigshafen (DE); Jean-Francois Stumbe, Strasbourg (FR); Michael Geprägs, Schwarzheide (DE)

(73) Assignee: BASF SE (DE)

( * ) Notice: Subject to any disclaimer, the term of this patent is extended or adjusted under 35 U.S.C. 154(b) by 580 days.

(21) Appl. No.: 11/632,703

(22) PCT Filed: Jul. 19, 2005

(86) PCT No.: PCT/EP2005/007838
§ 371 (c)(1),
(2), (4) Date: Jan. 18, 2007

(87) PCT Pub. No.: WO2006/008130
PCT Pub. Date: Jan. 26, 2006

(65) Prior Publication Data
US 2008/0033085 A1 Feb. 7, 2008

(30) Foreign Application Priority Data
Jul. 21, 2004 (DE) .......................... 10 2004 035 357

(51) Int. Cl.
*C08G 63/06* (2006.01)
(52) U.S. Cl.
USPC ......................................... 524/311; 525/450
(58) Field of Classification Search
USPC ................... 525/450, 210; 524/210, 450, 311
See application file for complete search history.

(56) References Cited

U.S. PATENT DOCUMENTS

| | | | |
|---|---|---|---|
| 3,305,605 A | 2/1967 | Hostettler et al. | |
| 3,479,314 A | 11/1969 | Williams | |
| 3,491,048 A | 1/1970 | Sargent | |
| 4,002,581 A | 1/1977 | Dolce | |
| 4,164,114 A | 8/1979 | Yabuki et al. | |
| 4,239,677 A | 12/1980 | Dieck | |
| 4,351,916 A | 9/1982 | Kohan | |
| 4,396,742 A | 8/1983 | Binsack et al. | |
| 4,771,109 A | 9/1988 | Eichenauer et al. | |
| 4,873,289 A | 10/1989 | Linder et al. | |
| 4,882,381 A | 11/1989 | Wittmann et al. | |
| 5,010,135 A | 4/1991 | Eckel et al. | |
| 5,136,014 A | 8/1992 | Figuly | |
| 5,144,005 A | 9/1992 | Sextro et al. | |
| 5,157,076 A | 10/1992 | Greenlee et al. | |
| 5,250,595 A | 10/1993 | Miyashita et al. | |
| 5,314,949 A | 5/1994 | Kozakura et al. | |
| 5,348,699 A | 9/1994 | Meyer et al. | |
| 5,399,620 A | 3/1995 | Niessner et al. | |
| 5,480,944 A | 1/1996 | Aharoni | |
| 5,496,887 A * | 3/1996 | Braune .......................... | 524/777 |
| 5,608,030 A | 3/1997 | Hoffmockel et al. | |
| 5,621,031 A | 4/1997 | Leimann et al. | |
| 5,712,336 A | 1/1998 | Gareiss et al. | |
| 5,844,059 A | 12/1998 | Yamamoto et al. | |
| 5,998,565 A | 12/1999 | de Brabander-van den Berg et al. | |
| 6,037,444 A | 3/2000 | Rannard et al. | |
| 6,087,449 A | 7/2000 | Tiefensee et al. | |
| 6,225,404 B1 | 5/2001 | Sorensen et al. | |
| 6,232,435 B1 * | 5/2001 | Heitz et al. ..................... | 528/491 |
| 6,252,025 B1 * | 6/2001 | Wang et al. ................ | 526/292.9 |
| 6,262,185 B1 * | 7/2001 | Heitz et al. ..................... | 525/437 |
| 6,300,424 B1 | 10/2001 | Frechet et al. | |
| 6,497,959 B1 | 12/2002 | Mhetar | |
| 6,528,612 B1 | 3/2003 | Brenner et al. | |
| 6,541,599 B1 | 4/2003 | Wang | |
| 6,894,112 B1 | 5/2005 | Weber et al. | |
| 7,081,509 B2 | 7/2006 | Wagner et al. | |

(Continued)

FOREIGN PATENT DOCUMENTS

| | | |
|---|---|---|
| BE | 702357 | 2/1968 |
| BE | 720658 | 11/1969 |

(Continued)

OTHER PUBLICATIONS

Carr et al., "Dielectric and mechanical characterization of aryl ester dendrimer/PET blends", Polymer, vol. 37 No. 12, 1996, pp. 2395-2401.

Lin et al., Polymerization of A2 with B3 Monomers: A Facile Approach to Hyperbranched Poly(aryl ester)s, Macromolecules, No. 36, 2003, pp. 9809-9816.

Luman, et al., "The Convergent Synthesis of Poly(glycerol-succinic acid) Dendritic Macromolecules", Chem. Eur. J., No. 9, 2003, pp. 5618-5626.

Jang, et al., "Crystallization Behavior of Poly(ethylene terephthalate) Blended with Hyperbranched Polymers: The Effect of Terminal Groups and Composition of Hyperbranched Polymers", Macromolecules, No. 33, 2000, pp. 1864-1870.

(Continued)

*Primary Examiner* — John Uselding
(74) *Attorney, Agent, or Firm* — Connolly Bove Lodge & Hutz LLP

(57) ABSTRACT

Continuous process for preparation of polyalkylene arylates A) comprising highly branched or hyperbranched polymers B) and, if appropriate, comprising lubricants C), by esterifying or transesterifying an aromatic dicarboxylic acid or its ester or ester-forming derivatives, with a molar excess of an aliphatic dihydroxy compound, and polycondensing the resultant transesterification or esterification product, which comprises, on achievement of at least 80% of the desired viscosity number, adding component B) and also, if appropriate, C) to the polymer melt, and, if appropriate, postcondensing the melt and then discharging, cooling, and pelletizing it, and also using, as component B), at least one highly branched or hyperbranched polycarbonate B1) with an OH number of from 1 to 600 mg KOH/g of polycarbonate (to DIN 53240, Part 2), or at least one highly branched or hyperbranched polyester B2) of $A_xB_y$ type, where x is at least 1.1 and y is at least 2.1, or a mixture of these.

19 Claims, No Drawings

U.S. PATENT DOCUMENTS

| | | |
|---|---|---|
| 2002/0120076 A1 | 8/2002 | Schueler et al. |
| 2002/0161113 A1 | 10/2002 | Dvornic et al. |
| 2003/0018104 A1 | 1/2003 | Mours et al. |
| 2003/0069370 A1* | 4/2003 | Dvornic et al. ............ 525/474 |
| 2003/0082384 A1* | 5/2003 | Mhetar ............ 428/412 |
| 2003/0171503 A1 | 9/2003 | Adedeji |
| 2004/0138388 A1 | 7/2004 | Pecorini et al. |
| 2004/0192857 A1 | 9/2004 | Borer et al. |
| 2004/0220374 A1 | 11/2004 | Heuer et al. |
| 2005/0025091 A1 | 2/2005 | Patel et al. |
| 2005/0054812 A1 | 3/2005 | Wagner et al. |
| 2005/0124779 A1 | 6/2005 | Shelby et al. |
| 2006/0142442 A1 | 6/2006 | Scherzer et al. |
| 2008/0015303 A1 | 1/2008 | Eibeck et al. |

FOREIGN PATENT DOCUMENTS

| | | |
|---|---|---|
| CA | 2019904 | 1/1991 |
| CA | 733567 | 5/1996 |
| CA | 2256343 | 12/1997 |
| CA | 2554037 | 8/2005 |
| CA | 2554038 | 8/2005 |
| DE | 55320 | 2/1891 |
| DE | 55319 | 3/1902 |
| DE | 222868 | 6/1910 |
| DE | 3725576 | 2/1989 |
| DE | 3800603 | 7/1989 |
| DE | 4307392 | 4/1994 |
| DE | 4328004 | 2/1995 |
| DE | 19953950 | 5/2001 |
| DE | 10132928 | 1/2003 |
| DE | 10136911 | 2/2003 |
| DE | 10147712 | 4/2003 |
| DE | 10163163 | 7/2003 |
| DE | 10240817 | 3/2004 |
| DE | 10251294 | 5/2004 |
| DE | 10304341 | 8/2004 |
| DE | 102004005652 | 8/2005 |
| DE | 102004005657 | 8/2005 |
| DE | 102004057867 | 6/2006 |
| DE | 102005012482 | 9/2006 |
| EP | 0050265 | 4/1982 |
| EP | 0047529 | 6/1985 |
| EP | 0208187 | 1/1987 |
| EP | 0235690 | 9/1987 |
| EP | 0319290 | 6/1989 |
| EP | 0410301 | 1/1991 |
| EP | 0484737 | 5/1992 |
| EP | 0545184 | 6/1993 |
| EP | 0629644 | 12/1994 |
| EP | 0682057 | 11/1995 |
| EP | 0736571 | 10/1996 |
| EP | 1099727 | 5/2001 |
| EP | 1207172 | 5/2002 |
| EP | 1344794 | 9/2003 |
| EP | 1424360 | 6/2004 |
| EP | 1424362 | 6/2004 |
| EP | 07114384.6 | 8/2007 |
| EP | 07121118.9 | 11/2007 |
| FR | 2833603 | 6/2003 |
| FR | 2833604 | 6/2003 |
| FR | 2856693 | 12/2004 |
| GB | 1458561 | 12/1976 |
| GB | 1558308 | 12/1979 |
| GB | 2324797 | 11/1998 |
| JP | 002379462 | 6/1992 |
| JP | 4175366 | 6/1992 |
| JP | 2006/100758 | 9/1992 |
| JP | 06157880 | 11/1992 |
| JP | 08269306 | 3/1995 |
| JP | 09157503 | 12/1995 |
| JP | 11060663 | 3/1999 |
| JP | 11255853 | 9/1999 |
| JP | 11279245 | 10/1999 |
| SU | 519449 | 6/1976 |
| WO | WO-96/11962 | 4/1996 |
| WO | WO-97/05705 | 2/1997 |
| WO | WO-97/08241 | 3/1997 |
| WO | WO-97/45474 | 12/1997 |
| WO | WO-98/50453 | 11/1998 |
| WO | WO00/58385 | 10/2000 |
| WO | WO-02/32982 | 4/2002 |
| WO | WO-03/004546 | 1/2003 |
| WO | WO-03/064502 | 8/2003 |
| WO | 03093343 | 11/2003 |
| WO | WO-2004/087785 | 10/2004 |
| WO | WO-2004/111126 | 12/2004 |
| WO | WO-2005/012380 | 2/2005 |
| WO | 20051075563 | 8/2005 |
| WO | 20051075565 | 8/2005 |
| WO | WO-2005/075563 | 8/2005 |
| WO | WO-2006/018127 | 2/2006 |
| WO | WO-2006/018128 | 2/2006 |
| WO | WO-2006/018179 | 2/2006 |
| WO | WO-2006/040066 | 4/2006 |
| WO | WO-2006/040101 | 4/2006 |
| WO | WO-2006/042673 | 4/2006 |
| WO | WO-2006/048247 | 5/2006 |
| WO | WO-2006/082201 | 8/2006 |
| WO | WO-2006/134115 | 12/2006 |
| WO | WO-2007/009929 | 12/2006 |
| WO | WO-2007/009930 | 1/2007 |
| WO | WO-2008/074687 | 6/2008 |

OTHER PUBLICATIONS

S. Rannard, et al. "A Highly Selective, one-Pot Multiple-Addition Convergent Synthesis of Polycarbonate Dendrimers", J. Am. Chem. Soc. 2000, 122, 11729-11730.

D. Bolton, et al., "Synthesis and Characterization of Hyperbranched Polycarbonates", *Macromolecules* 1997, 30, 1890-1896.

K. Pochner, et al., Treatment of Polymers for subsequent metallization using intense UV radiation or plasma at atmospheric pressure, 1997, 372-377, Surface and Coatings Technology 97.

A. Weber, et al., Metallization of Polymers Using Plasma-Enhanced Chemical Vapor Deposited Titanium Nitride as Interlayer, Mar. 1997, 1131-1135, Journal of the Electrochemical Society, vol. 14, No. 3.

H. Horn, et al., Excimer laser pretreatment and metallization of polymers, 1999, 270-284, Nuclear Instruments and Methods in Physics Research B151.

Massa, et al., "Novel Blends of Hyperbranched Polyesters and Linear polymers", *Macromolecules* (1995), pp. 3214-3220, vol. 28, No. 9.

Gorda, et al., "Star Shaped Condensation Polymers: Synthesis, Characterization, and Blend Properties", Journal of Applied Polymer Science (1993), pp. 1977-1983, vol. 50.

Sunder, et al., "Synthesis and Thermal Behaviour of Esterfied Alipghatic Hyperbranched Polyether Polyols", *Macromolecules* (2000), pp. 1330-1337, vol. 33.

Dr. S. Anders, et al., "Polycarbonate Polyacetale Polyester Celluloseester", Carl Hanser Verlag, 1992, pp. 118-119.

International Preliminary Report on Patentability for International Application No. PCT/EP2006/063167, issued Jan. 16, 2008.

International Preliminary Report on Patentability for International Application No. PCT/EP2006/063167, issued Dec. 17, 2007.

International Preliminary Report on Patentability for International Application No. PCT/EP2006/064182, issued Jan. 22, 2008.

International Preliminary Report on Patentability for International Application No. PCT/EP2006/064182, issued Feb. 5, 2008.

International Preliminary Report on Patentability for International Application No. PCT/EP2006/064180, issued Feb. 5, 2008.

International Preliminary Report on Patentability for International Application No. PCT/EP2006/064180, issued Jan. 22, 2008.

International Preliminary Report on Patentability for International Application No. PCT/EP2005/011704, issued May 22, 2007.

International Preliminary Report on Patentability for International Application No. PCT/EP2005/010854.

International Preliminary Report on Patentability for International Application No. PCT/EP2005/010854, issued Nov. 6, 2006.

International Preliminary Report on Patentability for International Application No. PCT/EP2006/042673.

International Preliminary Report on Patentability for International Application No. PCT/EP2005/001015.

International Preliminary Report on Patentability for International Application No. PCT/EP2005/001015, issued May 8, 2006.

International Preliminary Report on Patentability for International Application No. PCT/EP2006/050590, issued Aug. 14, 2007.
International Preliminary Report on Patentability for International Application No. PCT/EP2006/050590, issued Aug. 7, 2007.
International Preliminary Report on Patentability for International Application No. PCT/EP2005/010762, issued Apr. 24, 2007.
International Preliminary Report on Patentability for International Application No. PCT/EP2005/008339.
International Preliminary Report on Patentability for International Application No. PCT/EP2005/008339, issued Aug. 11, 2006.

* cited by examiner

CONTINUOUS PROCESS FOR PREPARING POLYALKYLENE ARYLATES WITH HYPERBRANCHED POLYESTERS AND/OR POLYCARBONATES

This application is the National Phase of International Application No. PCT/EP2005/007838 filed on Jul. 19, 2005; and this application claims priority to Application No. 10200403537.3 filed in Germany on Jul. 21, 2004 under 35 U.S.C. §119; the entire contents of all are hereby incorporated by reference.

The invention relates to an improved process for continuous preparation of polyalkylene arylates comprising hyperbranched polyester and/or comprising polycarbonates.

Polyalkylene arylates feature low water absorption and good dimensional stability, and also resistance to solvents.

One disadvantageous property is insufficient flowability and low crystallization rate, and these are problematic during processing of high-molecular-weight injection moldings or those with very thin walls.

Flowability can be improved simply by adding a hyperbranched polyester and/or polycarbonate—if appropriate in combination with other additives—for example as proposed in DE-A 10200400562.8 and DE-A 102004005657.9.

The prior art prepares polyesters with additives by incorporating the additives via mixing, e.g. in an extruder. The additional process step is expensive and moreover causes thermal degradation of the polymer. There is a need to improve the mechanical properties of the known molding compositions, in particular toughness and tensile strain at break. In particular, there is a need to improve flowability with very substantial retention of mechanical properties.

It was therefore an object of the present invention to provide an improved continuous process for preparation of polyalkylene arylates A) comprising hyperbranched or highly branched polymers B) and, if appropriate, comprising lubricants C), the process being more cost-effective and giving polyesters with better properties, without any substantial thermal degradation of the polymer. In particular, the intention is to improve mechanical properties, such as multiaxial impact strength, and susceptibility to yellowing, while providing better processing via rapid crystallization.

A particular intention is to improve flowability significantly, while retaining mechanical properties.

Surprisingly, it has been found that this object can be achieved by esterifying or transesterifying an aromatic dicarboxylic acid or its ester or ester-forming derivatives, with a molar excess of an aliphatic dihydroxy compound, and polycondensing the resultant transesterification or esterification product, which comprises, on achievement of at least 80% of the desired viscosity number, adding component B) and also, if appropriate, component C) to the polymer melt, and, if appropriate, post-condensing the melt and then discharging, cooling, and pelletizing it, and also using, as component B), at least one highly branched or hyperbranched polycarbonate B1) with an OH number of from 1 to 600 mg KOH/g of polycarbonate (to DIN 53240, Part 2), or at least one highly branched or hyperbranched polyester B2) of $A_xB_y$ type, where x is at least 1.1 and y is at least 2.1, or a mixture of these.

The subclaims give preferred embodiments.

As component A), the molding compositions obtainable according to the invention comprise from 10 to 99.9% by weight, preferably from 50 to 99.5% by weight, and in particular from 50 to 99.3% by weight, of a thermoplastic polyalkylene arylate.

These polyalkylene arylates are obtainable by esterifying or transesterifying an aromatic dicarboxylic acid or its esters or ester-forming derivatives, with a molar excess of an aliphatic dihydroxy compound, and polycondensing the resultant transesterification or esterification product in a known manner.

Preferred dicarboxylic acids which may be mentioned are 2,6-naphthalenedicarboxylic acid and terephthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexanediol, 2-methyl-1,5-pentanediol, 1,4-cyclohexanediol, 1,4-cyclohexanedimethanol and neopentylglycol, and mixtures of these.

Particularly preferred polyesters (A) which may be mentioned are polyalkylene terephthalates, which derive from alkanediols having from 2 to 10 carbon atoms, preferably from 2 to 6 carbon atoms. Among these, particular preference is given to polyethylene terephthalate and polybutylene terephthalate, and mixtures of these.

Other preferred polyesters are polyethylene terephthalates and polybutylene terephthalates which comprise, as other monomer units, up to 1% by weight, preferably up to 0.75% by weight, based on A), of 1,6-hexanediol and/or 5-methyl-1,5-pentanediol.

These polyalkylene terephthalates are known per se and are described in the literature. Their main chain comprises an aromatic ring which derives from the aromatic dicarboxylic acid. The aromatic ring may also have substitution, e.g. by halogen, such as chlorine and bromine, or by C1-C4-alkyl groups, such as methyl, ethyl, isopropyl, n-propyl, n-butyl, isobutyl, or tert-butyl groups.

Particular preference is given to polyesters whose carboxy end group content is up to 50 meq/kg of polyester, preferably up to 30 meq/kg of polyester, and in particular up to 27 meq/kg of polyester. By way of example, these polyesters may be prepared by a method based on the process of DE-A 44 01 055. The carboxy end group content is usually determined by titration methods (e.g. potentiometry).

The preparation is preferably continuous and based on DE-A 44 01 055, by a) in a first stage, esterifying or transesterifying an aromatic dicarboxylic acid or its esters or ester-forming derivatives, with a molar excess of a dihydroxy compound, b) in a second stage, precondensing the transesterification or esterification product obtained in a), and c) in a third stage, polycondensing the product obtainable from b) to the desired viscosity number, where stages a) and b) of the process are carried out in at least two temperature zones.

Stage a) of the process is termed a transesterification or esterification reaction. This is carried out in at least two, and preferably at least three, temperature zones. The temperature here of each zone should be higher than that of the preceding zone by from 1 to 40° C., preferably from 2 to 30° C. and in particular from 5 to 10° C. The temperature range for the entire esterification reaction is generally (depending on the starting material) from 160 to 240° C., preferably from 165 to 250° C. and in particular from 180 to 240° C., and the pressure is generally from 1 to 10 bar, preferably from 1 to 4 bar and in particular from 1 to 2 bar.

Stage a) of the process preferably operates in at least two temperature zones with very substantially identical pressure conditions in the individual zones. The technical requirements, such as apparatus (e.g. in the form of reactor cascades) for creating different temperature zones are known to the person skilled in the art, and therefore need not be described here in greater detail.

The starting materials, such as diols and acids, have been described above (component A).

The reaction is usually carried out with a molar excess of diol, in order to exert the desired influence on the ester equilibrium. The molar ratios of dicarboxylic acid and/or dicarboxylic ester to diol are usually from 1:1.1 to 1:3.5, preferably from 1:1.2 to 1:2.2. It is very particularly preferable for the molar ratios of dicarboxylic acid to diol to be from 1:1.5 to 1:2, and of diester to diol to be 1:1.2 to 1:1.5.

However, it is also possible to carry out the ester reaction with a small excess of diol in the first zone and correspondingly to add further amounts of diol in the other temperature zones. In the preferred embodiment of the novel process with three temperature zones, the entire amount of diol is divided over 3 zones in the following percentages: from 60 to 85 (1), from 10 to 25 (2) and from 5 to 15 (3), and preferably from 70 to 80 (1), from 10 to 20 (2), and from 5 to 10 (3).

The residence times for the entire stage a) are from 140 to 300 min, preferably from 150 to 260 min and in particular from 160 to 220 min, and the residence time for the first zone is from 100 to 190 min, preferably from 110 to 150 min, and for the second zone from 65 to 140 min, preferably from 65 to 110 min. For the preferred embodiment with three zones, the residence time in the 3rd zone is from 15 to 45 min, preferably from 15 to 30 min, with the residence times in the 2nd zone correspondingly being reduced and those in the 1st zone being retained as described above.

In the preferred embodiment of the novel process, the residence times preferably decrease from the first to the third zone in a ratio of 6:3:1.

In a particularly preferred embodiment, a catalyst and then an alkali metal compound or alkaline earth metal compound are firstly added to the dihydroxy compound, prior to stage a) of the process.

Preferred catalysts are titanium compounds and tin compounds, as disclosed inter alia in patent specifications U.S. Pat. No. 3,936,421 and U.S. Pat. No. 4,329,444. Preferred compounds which may be mentioned are tetrabutyl orthotitanate and triisopropyl titanate, and also tin dioctoate, which are usually used in stage a) in amounts of from 20 to 150 ppm, preferably from 20 to 120 ppm and in particular from 30 to 70 ppm (based on the metal).

To reduce further the carboxy end group content of the polyester it can be advantageous, before reacting the starting monomers, to add from 0.1 to 10 mmol, preferably from 0.2 to 0.65 mmol, of an alkali metal compound or alkaline earth metal compound (calculated as alkali metal or alkaline earth metal) per kg of polyester. Compounds of this type are proposed in DE-A 43 33 930. Preferred compounds which may be mentioned are sodium carbonate, sodium acetate and sodium alcoholates, in particular sodium methanolate.

The transesterification or esterification products are then transferred continuously to the precondensation stage b).

This has at least two temperature zones, preferably at least three and in particular at least four. The temperature of each zone here is higher than that of the preceding zone by from 1 to 40° C., preferably from 2 to 30° C. and in particular from 5 to 20° C. The temperature range for the entire precondensation is generally (depending on the starting materials) from 220 to 300° C., preferably from 225 to 290° C. and in particular from 240 to 290° C.

The precondensation is preferably carried out with a pressure in the first zone of from 0.5 to 1 bar, preferably from 0.6 to 0.8 bar, and in the second or last zone from 20 to 200 mbar, preferably from 25 to 150 mbar and in particular from 50 to 150 mbar. An example of a reactor which can be used industrially for this purpose is a vertical tube-bundle reactor, and other reactors for this purpose are known to the person skilled in the art.

The residence times for the entire stage b) of the process are from 10 to 80 min, preferably from 15 to 50 min and in particular from 20 to 40 min.

In a particularly preferred embodiment of the inventive process, use is made of four temperature zones. The relationships of temperature rising from zone to zone are as described above, and the pressure is reduced from the first to the fourth zone within the limits described. In this preferred embodiment of the tube-bundle heat exchanger, the fourth zone is composed of equipment for separating liquid and vapor phase (also termed a vapor separator). The ratio of the volume of the vapor separator to the volume in the tubes is preferably from 5 to 15:1, in particular from 8 to 13:1.

The volume ratios of the first three zones in this particularly preferred embodiment are designed in such a way that the proportion by volume made up by the first zone (volume ratios) is from 30 to 60%, preferably 50%, and that made up by the second zone is from 20 to 40%, preferably 30%, and that made up by the third zone is from 10 to 30%, preferably 20%. The temperature ranges, pressure ranges and residence times for the particularly preferred embodiment of the inventive process are listed below:

1st zone: Temperature from 230 to 270° C., preferably from 240 to 250° C., and pressure from 0.6 to 0.9 bar, preferably from 0.7 to 0.9 bar.
  Residence time from 10 to 30 min, preferably from 15 to 25 min.
2nd zone: Temperature from 240 to 280° C., preferably from 250 to 270° C., and pressure from 0.2 to 0.6 bar, preferably from 0.3 to 0.5 bar.
  Residence time from 5 to 25 min, preferably from 7 to 15 min.
3rd zone: Temperature from 245 to 290° C., preferably from 250 to 280° C., and pressure from 0.1 to 0.3 bar, preferably from 0.1 to 0.25 bar.
  Residence time from 5 to 10 min, preferably from 4 to 8 min.
4th zone: Temperature from 250 to 300° C., preferably from 252 to 285° C., and pressure from 0.015 to 0.2 bar, preferably from 0.025 to 0.15 bar.
  Residence time from 10 to 30 min, preferably from 14 to 24 min.

The catalysts mentioned above for stage a) of the process, and other additives, may be metered into stage b) of the process in the amounts mentioned.

After stage b) of the novel process, the polyester prepolymer has a viscosity number from 15 to 50 ml/g, preferably from 20 to 30 ml/g, measured on a 0.5% strength by weight solution in phenol/o-dichlorobenzene (1:1) in accordance with DIN 53728, Part 3 (1985) at 25° C.

The polyester prepolymer is then transferred to stage c) of the novel process. This is preferably carried out in a single stage at temperatures from 240 to 290° C., preferably from 240 to 270° C. and in particular from 240 to 265° C. The pressure is from 0.3 to 10 mbar, preferably from 0.3 to 5 mbar and in particular from 0.3 to 2 mbar.

The residence times are usually from 30 to 180 min, preferably from 35 to 150 min.

During the polycondensation, the surface of the product may preferably be refreshed. Surface refreshment is the continuous arrival of fresh polymer at the surface of the melt, facilitating the escape of the diol.

This is preferably from 1 to 20 m²/kg of product and minute, and in particular from 1.5 to 6 m²/kg of product and minute.

It may moreover be advantageous for addition of catalysts and other additives, as described above, to continue in this stage of the process.

After the continuous polycondensation process, the polyester has a viscosity number of from 60 to 180 ml/g, preferably from 90 to 160 ml/g, determined in a 0.5% strength by weight solution in a phenol/o-dichlorobenzene mixture (ratio by weight 1:1) at 25° C. to DIN 53728, Part 3 (1985).

A substantive feature of the inventive process is that on achievement of at least 80%, preferably at least 95%, and in particular 100%, of the desired final viscosity number of the polyester, at least one highly branched or hyperbranched polycarbonate B) with an OH number of from 1 to 600 mg KOH/g of polycarbonate (to DIN 53 240, Part 2) and, if appropriate, lubricant C), is added jointly to the polymer melt, the melt is post-condensed, if appropriate, and then discharged, cooled, and pelletized. The amount preferably added as the lubricant C) is from 0.01 to 3% by weight, with preference from 0.1 to 1% by weight, and in particular from 0.2 to 0.8% by weight, based on 100% by weight of components A) to C).

The particularly preferred form of the addition is that of a suspension, component B being suspended prior to addition to the melt, if appropriate at an elevated temperature, in the lubricant. Depending on the nature of the lubricant used, it may be necessary to preheat the mixture composed of lubricant and nucleating agent to temperatures of from 30 to 150° C., preferably from 60 to 130° C., in order to prepare a suspension, and then to add the material to the polymer melt.

As example which may be mentioned of these materials is low-molecular-weight polyethylene waxes, which are known to be solid at room temperature and which have to be heated in order to prepare a suspension with the nucleating agent.

Components B) and, if appropriate, C) are preferably added during the polycondensation process on achievement of at least 80% of the desired final viscosity number. Suitable polycondensation apparatuses are known to the person skilled in the art, and no further details are therefore needed in that connection. In one particularly preferred embodiment of the inventive process, the melt may be discharged from the polycondensation reactor, and the mixture composed of B) and C) may be added by way of suitable apparatuses, e.g. a metering pump with a heating system, and the polymer melt may then be transferred into, by way of example, a Sulzer tube and condensed to the desired final viscosity number, whereupon homogenization of the melt takes place, and the material can then be discharged, cooled, and pelletized.

As component B), the molding compositions obtainable according to the invention comprise from 0.01 to 50% by weight, preferably from 0.5 to 20% by weight, and in particular from 0.7 to 10% by weight, of at least one highly branched or hyperbranched polycarbonate B1), with an OH number of from 1 to 600, preferably from 10 to 550, and in particular from 50 to 550, mg KOH/g of polycarbonate (to DIN 53240, Part 2), or of at least one polyester B2), or a mixture of these, as explained below.

For the purposes of this invention, hyperbranched polycarbonates B1) are non-crosslinked macromolecules having hydroxy groups and carbonate groups and which are structurally and molecularly non-uniform. They may firstly have a structure based on a central molecule, as is the case with dendrimers, but with non-uniform chain length of the branches. Secondly, they may also have a linear structure having functional side groups, or else, combining the two extremes, have linear and branched molecular moieties. For a definition of dendrimers and of hyperbranched polymers, see also P. J. Flory, J. Am. Chem. Soc. 1952, 74, 2718 and H. Frey et al., Chem. Eur. J. 2000, 6, No.14, 2499.

For the purposes of the present invention, "hyperbranched" means that the degree of branching (DB), i.e. the average number of dendritic linkages plus the average number of end groups per molecule, amounts to from 10 to 99.9%, preferably from 20 to 99%, particularly preferably from 20 to 95%.

For the purposes of the present invention, "dendrimeric" means that the degree of branching amounts to from 99.9 to 100%. For a definition of "degree of branching", see H. Frey et al., Acta Polym. 1997, 48, 30, this being defined as $$DB = \frac{T+Z}{T+Z+L} \times 100\%$$

(where T is the average number of terminal monomer units, Z is the average number of branched monomer units, and L is the average number of linear monomer units in the macromolecules of the respective substances).

Component B1) preferably has a number-average molar mass $M_n$ of from 100 to 15 000, preferably from 200 to 12 000, and in particular from 500 to 10 000 g/mol (GPC, PMMA standard).

The glass transition temperature Tg is in particular from −80 to +140° C., preferably from −60 to 120° C. (by DSC, DIN 53765).

In particular, the viscosity (mPas) at 23° C. (to DIN 53019) is from 50 to 200 000, in particular from 100 to 150 000, and very particularly preferably from 200 to 100 000.

Component B1) is preferably obtainable via a process which comprises at least the following steps:

a) reacting at least one organic carbonate (A) of the general formula RO[(CO)]$_n$OR with at least one aliphatic, aliphatic/aromatic, or aromatic alcohol (B) which has at least 3 OH groups, with elimination of alcohols ROH to give one or more condensates (K), where each R, independently of the others, is a straight-chain or branched aliphatic, aromatic/aliphatic, or aromatic hydrocarbon radical having from 1 to 20 carbon atoms, and where the radicals R may also have bonding to one another to form a ring, and n is a whole number from 1 to 5, or ab) reacting phosgene, diphosgene, or triphosgene with abovementioned alcohol (B) with elimination of hydrogen chloride, and b) intermolecular reaction of the condensates (K) to give a highly functional, highly branched, or highly functional, hyperbranched polycarbonate,
where the quantitative proportion of the OH groups to the carbonates in the reaction mixture is selected in such a way that the condensates (K) have an average of either one carbonate group and more than one OH group or one OH group and more than one carbonate group.

The starting material used may comprise phosgene, diphosgene, or triphosgene, but preference is given here to organic carbonates.

Each of the radicals R of the organic carbonates (A) used as starting material and having the general formula RO(CO)$_n$OR is, independently of the others, a straight-chain or branched aliphatic, aromatic/aliphatic, or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or a substituted or unsubstituted phenyl radical.

Simple carbonates of the formula RO(CO)$_n$OR are particularly used; n is preferably from 1 to 3, in particular 1.

By way of example, dialkyl or diaryl carbonates may be prepared from the reaction of aliphatic, araliphatic, or aromatic alcohols, preferably monoalcohols, with phosgene. They may also be prepared by way of oxidative carbonylation of the alcohols or phenols by means of CO in the presence of noble metals, oxygen, or NO$_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic, aromatic/aliphatic, or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates in which n is greater than 1 comprise dialkyl dicarbonates, such as di(tert-butyl)dicarbonate, or dialkyl tricarbonates, such as di(tert-butyl)tricarbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (B) which has at least 3 OH groups, or with mixtures of two or more different alcohols.

Examples of compounds having at least three OH groups comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, polyglycerines, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, bis(trimethylolpropane), or sugars, e.g. glucose, trifunctional or higher-functionality polyetherols based on trifunctional or higher-functionality alcohols and ethylene oxide, propylene oxide, or butylene oxide, or polyesterols. Particular preference is given here to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (B'), with the proviso that the average total OH functionality of all of the alcohols used is greater than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis(4-bis(hydroxyphenyl)sulfide, bis(4-hydroxyphenyl)sulfone, bis(hydroxymethyl)benzene, bis(hydroxymethyl)toluene, bis(p-hydroxyphenyl)methane, bis(p-hydroxyphenyl)ethane, 2,2-bis(p-hydroxyphenyl)propane, 1,1-bis(p-hydroxyphenyl)cyclohexane, dihydroxybenzophenone, dihydric polyether polyols based on ethylene oxide, propylene oxide, butylene oxide, or their mixtures, polytetrahydrofuran, polycaprolactone, or polyesterols based on diols and dicarboxylic acids.

The diols serve for fine adjustment of the properties of the polycarbonates. If dihydric alcohols are used, the ratio of dihydric alcohols B') to the at least trihydric alcohols (B) is adjusted by the person skilled in the art as a function of the desired properties of the polycarbonate. The amount of the alcohol(s) (B') is generally from 0 to 50 mol %, based on the total amount of all of the alcohols (B) and (B') taken together. The amount is preferably from 0 to 45 mol %, particularly preferably from 0 to 35 mol %, and very particularly preferably from 0 to 30 mol %.

The reaction of phosgene, diphosgene, or triphosgene with the alcohol or alcohol mixture generally takes place with elimination of hydrogen chloride, and the reaction of the carbonates with the alcohol or alcohol mixture to give the inventive highly functional highly branched polycarbonate takes place with elimination of the monohydric alcohol or phenol from the carbonate molecule.

The highly functional highly branched polycarbonates formed by the inventive process have termination by hydroxy groups and/or by carbonate groups after the reaction, i.e. with no further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a highly functional polycarbonate is a product which, besides the carbonate groups which form the polymer skeleton, further has at least three, preferably at least six, more preferably at least ten, terminal or pendent functional groups. The functional groups are carbonate groups and/or OH groups. There is in principle no upper restriction on the number of the terminal or pendent functional groups, but products having a very high number of functional groups can have undesired properties, such as high viscosity or poor solubility. The highly functional polycarbonates of the present invention mostly have not more than 500 terminal or pendent functional groups, preferably not more than 100 terminal or pendent functional groups.

When preparing the highly functional polycarbonates B1), it is necessary to adjust the ratio of the compounds containing OH groups to phosgene or carbonate in such a way that the simplest resultant condensate (hereinafter termed condensate (K)) comprises an average of either one carbonate group or carbamoyl group and more than one OH group or one OH group and more than one carbonate group or carbamoyl group. The simplest structure of the condensate (K) made from a carbonate (A) and a di- or polyalcohol (B) here results in the arrangement XY$_n$ or Y$_n$X, where X is a carbonate group, Y is a hydroxy group, and n is generally a number from 1 to 6, preferably from 1 to 4, particularly preferably from 1 to 3. The reactive group which is the resultant single group here is generally termed "focal group" below.

By way of example, if during the preparation of the simplest condensate (K) from a carbonate and a dihydric alcohol the reaction ratio is 1:1, the average result is a molecule of XY type, illustrated by the general formula 1.

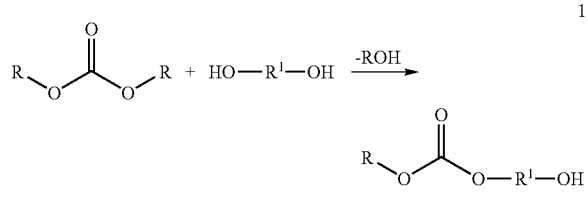

1

During the preparation of the condensate (K) from a carbonate and a trihydric alcohol with a reaction ratio of 1:1, the average result is a molecule of $XY_2$ type, illustrated by the general formula 2. A carbonate group is focal group here.

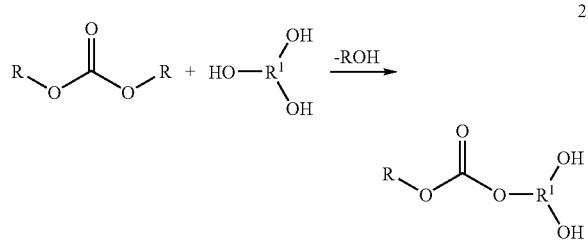

2

During the preparation of the condensate (K) from a carbonate and a tetrahydric alcohol, likewise with the reaction ratio 1:1, the average result is a molecule of $XY_3$ type, illustrated by the general formula 3. A carbonate group is focal group here.

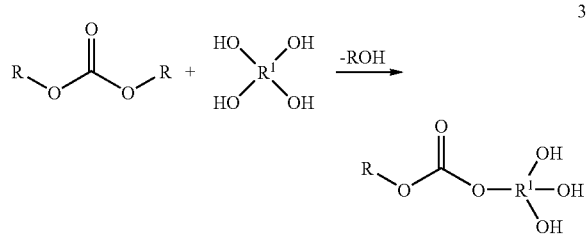

3

R in the formulae 1-3 has the definition given at the outset, and $R^1$ is an aliphatic or aromatic radical.

The condensate (K) may, by way of example, also be prepared from a carbonate and a trihydric alcohol, as illustrated by the general formula 4, the molar reaction ratio being 2:1. Here, the average result is a molecule of $X_2Y$ type, an OH group being focal group here. In formula 4, R and $R^1$ are as defined in formulae 1 to 3.

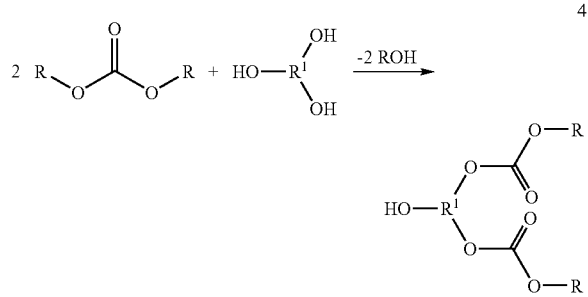

4

If difunctional compounds, e.g. a dicarbonate or a diol, are also added to the components, this extends the chains, as illustrated by way of example in the general formula 5. The average result is again a molecule of $XY_2$ type, a carbonate group being focal group.

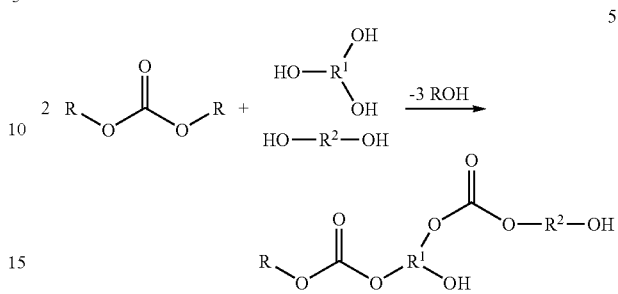

5

In formula 5, $R^2$ is an organic, preferably aliphatic radical, and R and $R^1$ are as defined above.

It is also possible to use two or more condensates (K) for the synthesis. On the one hand, two or more alcohols or two or more carbonates can be used here. Furthermore, mixtures of various condensates of different structure can be obtained via the selection of the ratio of the alcohols used and of the carbonates or the phosgenes. This will be illustrated taking the example of the reaction of a carbonate with a trihydric alcohol. If the starting materials are reacted in a ratio of 1:1, as illustrated in (II), the product is an $XY_2$ molecule. If the starting materials are reacted in a ratio of 2:1, as illustrated in (IV), the product is an $X_2Y$ molecule. If the ratio is from 1:1 to 2:1, the product is a mixture of $XY_2$ and $X_2Y$ molecules.

According to the invention, the simple condensates (K) described by way of example in the formulae 1-5 preferentially react intermolecularly to form highly functional polycondensates, hereinafter termed polycondensates (P). The reaction to give the condensate (K) and to give the polycondensate (P) usually takes place at a temperature of from 0 to 250° C., preferably from 60 to 160° C., in bulk or in solution. Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one preferred embodiment, the condensation reaction is carried out in bulk. The phenol or the monohydric alcohol ROH liberated during the reaction can be removed by distillation from the reaction equilibrium to accelerate the reaction, if appropriate at reduced pressure.

If removal by distillation is intended, it is generally advisable to use those carbonates which liberate alcohols ROH with a boiling point below 140° C. during the reaction.

Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, or potassium, or of cesium, tertiary amines, guanidines, ammonium compounds, phosphonium compounds, organoaluminum, organotin, organozinc, organotitanium, organozirconium, or organobismuth compounds, or else what are known as double metal cyanide (DMC) catalysts, e.g. as described in DE 10138216 or DE 10147712.

It is preferable to use potassium hydroxide, potassium carbonate, potassium hydrogencarbonate, diazabicyclooctane (DABCO), diazabicyclononene (DBN), diazabicycloundecene (DBU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) prepared at an elevated temperature are usually stable at room temperature for a relatively long period.

The nature of the condensates (K) permits polycondensates (P) with different structures to result from the condensation reaction, these having branching but no crosslinking. Ideally, furthermore, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula 2 can react via triple intermolecular condensation to give two different polycondensates (P), represented in the general formulae 6 and 7.

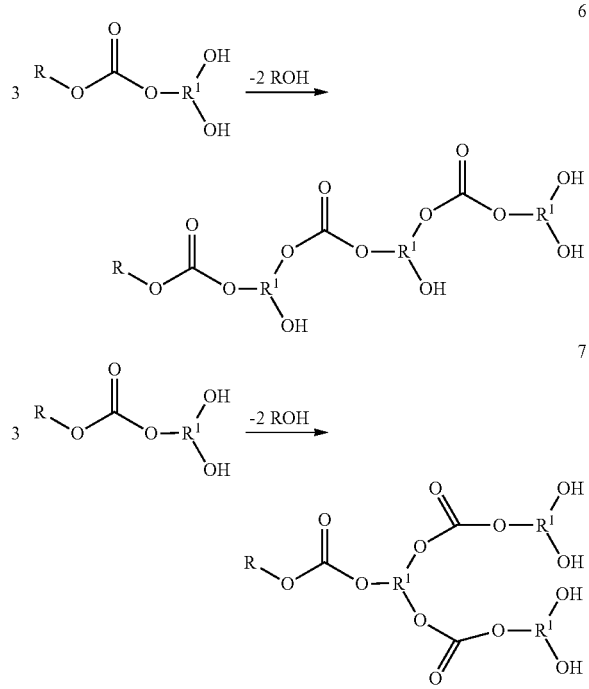

In formulae 6 and 7, R and $R^1$ are as defined above.

There are various ways of terminating the intermolecular polycondensation reaction. By way of example, the temperature may be lowered to a range where the reaction stops and the product (K) or the polycondensate (P) is storage-stable.

The catalyst may also be deactivated, by way of example in the case of basic catalysts via addition of Lewis acids or proton acids.

In another embodiment, as soon as the intermolecular reaction of the condensate (K) has produced a polycondensate (P) with the desired degree of polycondensation, a product having groups reactive toward the focal group of (P) may be added to the product (P) to terminate the reaction. For example, in the case of a carbonate group as focal group, by way of example, a mono-, di-, or polyamine may be added. In the case of a hydroxy group as focal group, by way of example, a mono-, di-, or polyisocyanate, or a compound containing epoxy groups, or an acid derivative which reacts with OH groups, can be added to the product (P).

The inventive highly functional polycarbonates are mostly prepared in the pressure range from 0.1 mbar to 20 bar, preferably at from 1 mbar to 5 bar, in reactors or reaction cascades which are operated batchwise, semicontinuously, or continuously.

The inventive products can be further processed without further purification after their preparation by virtue of the abovementioned adjustment of the reaction conditions and, if appropriate, by virtue of the selection of the suitable solvent.

In another preferred embodiment, the product is stripped, i.e. freed from low-molecular-weight, volatile compounds. For this, once the desired degree of conversion has been reached, the catalyst is optionally deactivated, and the low-molecular-weight volatile constituents, e.g. monoalcohols, phenols, carbonates, hydrogen chloride, or volatile oligomeric or cyclic compounds, can be removed by distillation, if appropriate with introduction of a gas, preferably nitrogen, carbon dioxide, or air, if appropriate at reduced pressure.

In another preferred embodiment, the inventive polycarbonates may contain other functional groups besides the functional groups present at this stage by virtue of the reaction. This functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate or hydroxy groups.

Effects of this type may, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

An example of a compound which may be used for modification with mercapto groups is mercaptoethanol. By way of example, tertiary amino groups can be produced via incorporation of N-methyldiethanolamine, N-methyldipropanolamine or N,N-dimethylethanolamine. By way of example, ether groups may be generated via co-condensation of di- or higher-functionality polyetherols. Long-chain alkyl radicals can be introduced via reaction with long-chain alkanediols, and reaction with alkyl or aryl diisocyanates generates polycarbonates having alkyl, aryl, and urethane groups or urea groups.

Ester groups can be produced via addition of dicarboxylic acids or tricarboxylic acids, or, by way of example, dimethyl terephthalate, or tricarboxylic esters.

Subsequent functionalization can be achieved by using an additional step of the process (step c)) to react the resultant highly functional highly branched, or highly functional hyperbranched polycarbonate with a suitable functionalizing reagent which can react with the OH and/or carbonate groups or carbamoyl groups of the polycarbonate.

By way of example, highly functional highly branched, or highly functional hyperbranched polycarbonates comprising hydroxy groups can be modified via addition of molecules comprising acid groups or isocyanate groups. By way of example, polycarbonates comprising acid groups can be obtained via reaction with compounds comprising anhydride groups.

Highly functional polycarbonates comprising hydroxy groups may moreover also be converted into highly functional polycarbonate polyether polyols via reaction with alkylene oxides, such as ethylene oxide, propylene oxide or butylene oxide.

A great advantage of the process is its cost-effectiveness. The reaction to give a condensate (K) or polycondensate (P) and the reaction of (K) or (P) to give polycarbonates having other functional groups or elements can take place in one reaction apparatus, and this is technically and economically advantageous.

As component B2), the molding compositions obtainable according to the invention may comprise from at least 0.01 to 50% by weight, preferably from 0.5 to 20% by weight, and in particular from 0.7 to 10% by weight, of at least one hyperbranched polyester of $A_xB_y$ type, where
x is at least 1.1, preferably at least 1.3, in particular at least 2, and
y is at least 2.1, preferably at least 2.5, in particular at least 3.

The units A and, respectively, B used may also, of course, comprise mixtures. An $A_xB_y$-type polyester is a condensate composed of an x-functional molecule A and a y-functional molecule B. By way of example, mention may be made of a polyester composed of adipic acid as molecule A (x=2) and glycerol as molecule B (y=3).

For the purposes of this invention, hyperbranched polycarbonates B2) are non-crosslinked macromolecules having hydroxy groups and carboxy groups, these having both structural and molecular non-uniformity. Their structure may firstly be based on a central molecule in the same way as dendrimers, but with non-uniform chain length of the branches. Secondly, they may also have a linear structure with functional pendent groups, or else they combine the two extremes, having linear and branched molecular portions. See also P. J. Flory, J. Am. Chem. Soc. 1952, 74, 2718, and H. Frey et al., Chem. Eur. J. 2000, 6, No. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%. "Dendrimeric" in the context of the present invention means that the degree of branching is from 99.9 to 100%. See H. Frey et al., Acta Polym. 1997, 48, 30 for the definition of "degree of branching".

Component B2) preferably has an $M_n$ of from 300 to 30 000 g/mol, in particular from 400 to 25 000 g/mol, and very particularly from 500 to 20 000 g/mol, determined by means of GPC, PMMA standard, dimethylacetamide eluent.

B2) preferably has an OH number of from 0 to 600 mg KOH/g of polyester, preferably of from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The $T_g$ is preferably from −50° C. to 140° C., and in particular from −50 to 100° C. (by means of DSC, to DIN 53765).

Preference is particularly given to those components B2) in which at least one OH or COOH number is greater than 0, preferably greater than 0.1, and in particular greater than 0.5.

The inventive component B2) is in particular obtainable via the processes described below, inter alia by reacting
(a) one or more dicarboxylic acids or one or more derivatives of the same with one or more at least trihydric alcohols
or
(b) one or more tricarboxylic acids or higher polycarboxylic acids or one or more derivatives of the same with one or more diols
in the presence of a solvent and optionally in the presence of an inorganic, organometallic, or low-molecular-weight organic catalyst, or of an enzyme. The reaction in solvent is the preferred preparation method.

For the purposes of the present invention, highly functional hyperbranched polyesters B2) have molecular and structural non-uniformity. Their molecular non-uniformity distinguishes them from dendrimers, and they can therefore be prepared at considerably lower cost.

Among the dicarboxylic acids which can be reacted according to variant (a) are, by way of example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid,
and the abovementioned dicarboxylic acids may have substitution by one or more radicals selected from
$C_1$-$C_{10}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl,
$C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl, and cycloheptyl;
alkylene groups, such as methylene or ethylidene, or
$C_6$-$C_{14}$-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned of representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which may be reacted according to variant (a) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably
  the relevant anhydrides in monomeric or else polymeric form,
  mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol,
  and also mono- and divinyl esters, and
  mixed esters, preferably methyl ethyl esters.

In the preferred preparation process it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl ester thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which may be reacted according to variant (b) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are preferably
  the relevant anhydrides in monomeric or else polymeric form,
  mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters
  and mixed methyl ethyl esters.

For the purposes of the present invention, it is also possible to use a mixture composed of a tri- or polycarboxylic acid and one or more of its derivatives. For the purposes of the present invention it is likewise possible to use a mixture of two or more different derivatives of one or more tri- or polycarboxylic acids, in order to obtain component B.

Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol, polyethylene glycols HO($CH_2CH_2O$)$_n$—H or polypropylene glycols HO(CH[$CH_3$]$CH_2O$)$_n$—H or mixtures of two or more representative compounds of the above compounds, where n is a whole number and n=4 to 25. One, or else both, hydroxy groups here in the abovementioned diols may also be substituted by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (a) and (b) is from 4:1 to 1:4, in particular from 2:1 to 1:2.

The at least trihydric alcohols reacted according to variant (a) of the process may have hydroxy groups all of which have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (a) may also have hydroxy groups having at least two different chemical reactivities.

The different reactivity of the functional groups here may either derive from chemical causes (e.g. primary/secondary/tertiary OH group) or from steric causes.

By way of example, the triol may comprise a triol which has primary and secondary hydroxy groups, preferred example being glycerol.

When the inventive reaction is carried out according to variant (a), it is preferable to operate in the absence of diols and monohydric alcohols.

When the inventive reaction is carried out according to variant (b), it is preferable to operate in the absence of mono- or dicarboxylic acids.

The inventive process is carried out in the presence of a solvent. Examples of suitable solvents are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents in the absence of acidic catalysts are: ethers, such as dioxane or tetrahydrofuran, and ketones, such as methyl ethyl ketone and methyl isobutyl ketone.

According to the invention, the amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate reduces markedly at markedly lower concentrations of the reactants, giving uneconomically long reaction times.

To carry out the process preferred according to the invention, operations may be carried out in the presence of a dehydrating agent as additive, added at the start of the reaction. Suitable examples are molecular sieves, in particular 4A molecular sieve, $MgSO_4$, and $Na_2SO_4$. During the reaction it is also possible to add further dehydrating agent or to replace dehydrating agent by fresh dehydrating agent. During the reaction it is also possible to remove the water or alcohol formed by distillation and, for example, to use a water separator.

The reaction may be carried out in the absence of acidic catalysts. It is preferable to operate in the presence of an acidic inorganic, organometallic, or organic catalyst, or a mixture composed of two or more acidic inorganic, organometallic, or organic catalysts.

For the purposes of the present invention, examples of acidic inorganic catalysts are sulfuric acid, phosphoric acid, phosphonic acid, hypophosphorous acid, aluminum sulfate hydrate, alum, acidic silica gel (pH=6, in particular=5), and acidic aluminum oxide. Examples of other compounds which may be used as acidic inorganic catalysts are aluminum compounds of the general formula Al(OR)$_3$ and titanates of the general formula Ti(OR)$_4$, where each of the radicals R may be identical or different and is selected independently of the others from $C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in Al(OR)$_3$ or Ti(OR)$_4$ is preferably identical and selected from isopropyl or 2-ethylhexyl.

Examples of preferred acidic organometallic catalysts are selected from dialkyltin oxides $R_2SnO$, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are acidic organic compounds having, by way of example, phosphate groups, sulfonic acid groups, sulfate groups, or phosphonic acid groups. Particular preference is given to sulfonic acids, such as para-toluenesulfonic acid. Acidic ion exchangers may also be used as acidic organic catalysts, e.g. polystyrene resins containing sulfonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The process is preferably carried out under inert gas, e.g. under carbon dioxide, nitrogen, or a noble gas, among which mention may particularly be made of argon.

The process is preferably carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred.

The pressure conditions for the process are not critical per se. It is possible to operate at markedly reduced pressure, e.g. at from 10 to 500 mbar. The inventive process may also be carried out at pressures above 500 mbar. A reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred.

The reaction time for the process is usually from 10 minutes to 25 hours, preferably from 30 minutes to 10 hours, and particularly preferably from one to 8 hours.

Once the reaction has ended, the highly functional hyperbranched polyesters B2) can easily be isolated, e.g. by removing the catalyst by filtration and concentrating the mixture, the concentration process here usually being carried out at reduced pressure. Other work-up methods with good suitability are precipitation after addition of water, followed by washing and drying.

Component B2) can also be prepared in the presence of enzymes or decomposition products of enzymes (according to DE-A 101 63163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geolrichum viscosum, Geotrichum candidum, Mucor javanicus, Mucor mihei*, pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii*, or esterase from *Bacillus* spp. and *Bacillus thermoglucosidasius*. *Candida antarctica* lipase B is particularly preferred. The enzymes listed are commercially available, for example from Novozymes Biotech Inc., Denmark.

The enzyme is preferably used in immobilized form, for example on silica gel or Lewatit®. The processes for immobilizing enzymes are known per se, e.g. from Kurt Faber, "Biotransformations in organic chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the total weight of the starting materials used and to be reacted.

The process is carried out at temperatures above 60° C. It is preferable to operate at temperatures of 100° C. or below that temperature. Preference is given to temperatures up to 80° C., very particular preference is given to temperatures of from 62 to 75° C., and still more preference is given to temperatures of from 65 to 75° C.

The process is carried out in the presence of a solvent. Examples of suitable solvents are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The process is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. The reaction at atmospheric pressure is preferred.

The reaction time for the process is usually from 4 hours to 6 days, preferably from 5 hours to 5 days, and particularly preferably from 8 hours to 4 days.

Once the reaction has ended, the highly functional hyperbranched polyesters B2) can easily be isolated, e.g. by removing the enzyme by filtration and concentrating the mixture, the concentration process here usually being carried out at reduced pressure. Other work-up methods with good suitability are precipitation after addition of water, followed by washing and drying.

The highly functional hyperbranched polyesters B2) feature particularly low contents of discolored and resinified material. For the definition of hyperbranched polymers, see also: P. J. Flory, J. Am. Chem. Soc. 1952, 74, 2718, and A. Sunder et al., Chem. Eur. J. 2000, 6, No.1, 1-8. However, in the context of the present invention, "highly functional hyperbranched" means that the degree of branching, i.e. the average number of dendritic linkages plus the average number of end groups per molecule is from 10 to 99.9%, preferably from 20 to 99%, particularly preferably from 30 to 90% (see in this connection H. Frey et al. Acta Polym. 1997, 48, 30).

The polyesters B2) according to the invention have a molar mass $M_n$ of from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be prepared using up to 50% by weight, in some cases even up to 80% by weight, of the polyesters according to the invention in tetrahydrofuran (THF), n-butyl acetate, ethanol, and numerous other solvents, with no gel particles detectable by the naked eye.

The highly functional hyperbranched polyesters B2) according to the invention are carboxy-terminated, carboxy- and hydroxy-terminated, and preferably hydroxy-terminated.

The ratios of the components B1): B2) are preferably from 1:20 to 20:1, in particular from 1:15 to 15:1, and very particularly preferably from 1:5 to 5:1, if B1 is used in a mixture with B2.

The hyperbranched polycarbonates B1/polyesters B2 used are particles whose size is from 20 to 500 nm. These nanoparticles are present in fine dispersion in the polymer blend, and the size of the particles in the compounded material is from 20 to 500 nm, preferably from 50 to 300 nm.

Compounded materials of this type are commercially available as Ultradur® high speed.

Suitable lubricants C) are low-molecular-weight polyethylene waxes which may preferably comprise functional groups, such as glycidyl group and/or carboxy group, with a number-average molar mass Mn of from 500 to 20 000 g/mol, preferably from 1000 to 10 000 g/mol, in particular from 1000 to 5000 g/mol, and very particularly preferably from 1000 to 3000 g/mol.

The molecular weight is usually determined via gel permeation chromatography (GPC), using an LDPE standard. The melt viscosity is preferably from 10 to 10 000 mm$^2$/g (to DIN 51562), preferably from 100 to 5000 mm$^2$/g, in particular from 100 to 3000 mm$^2$/g, and very particularly from 100 to 2000 mm$^2$/g, at a temperature of 120° C.

The polyethylenes containing acid groups or containing epoxy groups may be copolymers of ethylene with α,β-unsaturated acid compounds or with epoxy compounds, or else polyethylenes onto which acid compounds or epoxy compounds are grafted.

The polyethylenes may be prepared by the high-, medium-, or low-pressure process. Use may be made of high-density polyethylenes (HDPEs) (range from 0.94 to 0.97 g/cm$^3$), preferably prepared by the Phillips process (medium-pressure process), or else of low-density polyethylenes (LDPEs) (range from 0.91 to 0.94 g/cm$^3$), in particular of low-density linear polyethylenes, preferably prepared by the gas-phase process.

The person skilled in the art is aware of processes for preparation of these copolymers (e.g. Ullmanns Enzyklopädie der Technischen Chemie [Ullmann's Encyclopedia of Industrial Chemistry], 4th edition, vol. 19, pp. 169-175).

Suitable products are commercially available with the trademark Luwax® (BASF AG), Hoechst-Wachs® PED 191, or H12 (Hoechst AG), or else Poligen® EAS-1 (BASF AG).

Other lubricants are esters or amides of saturated or unsaturated aliphatic carboxylic acids having from 10 to 40, preferably from 16 to 22, carbon atoms, with saturated aliphatic alcohols or amines having from 2 to 40, preferably 2 to 6, carbon atoms.

The carboxylic acids may be mono- or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric, and it is not necessary for all of the OH groups here to have been esterified. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono- to trifunctional. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, ethylenediamine distearate, glycerol monopalmitate, glycerol trilaurate, glycerol monobehenate, and pentaerythritol tetrastearate.

It is also possible to use mixtures of various esters or amides, or esters with amides combined, in any desired mixing ratio.

The morphology of selected compounded materials was studied via transmission electron microscopy. Good dispersion of the particles in the blend is seen. Particle sizes of from 20 to 500 nm were found.

The polyesters obtainable by the process described above have improved mechanical properties, in particular multiaxial impact strength, less susceptibility to yellowing, and better processability, because susceptibility to crystallization has been substantially improved. Flowability, in particular, has been markedly improved, with very substantial retention of mechanical properties.

For other applications, the inventive polyesters may be blended with further additives, preferably for electrical and electronic applications, optical waveguides, etc.

EXAMPLES

Preparation Specification for Polycarbonates B1
General Operating Specification:
As shown in table 1, equimolar amounts of the polyhydric alcohol and diethyl carbonate were mixed in a three-necked flask equipped with stirrer, reflux condenser, and internal thermometer, and 250 ppm of catalyst (based on the amount of alcohol) were added. The mixture was then heated with stirring to 100° C., and in the experiment indicated by * to 140° C., and stirred for 2 h at this temperature. Evaporative cooling caused by the monoalcohol liberated reduced the temperature of the reaction mixture here as the reaction proceeded. The reflux condenser was now replaced by an inclined condenser, ethanol was removed by distillation, and the temperature of the reaction mixture was increased slowly to 160° C.

The ethanol removed by distillation was collected in a cooled round-bottomed flask, and weighed, and the conversion was thus determined as a percentage based on the full conversion theoretically possible (see table 1).

The reaction products were then analyzed by gel permeation chromatography, the eluent being dimethylacetamide and the standard being polymethyl methacrylate (PMMA).

TABLE 1

| Alcohol | Catalyst | Amount of ethanol distillate, based on full conversion [mol %] | Molecular weight $M_w$ $M_n$ | Visc. 23° [mPas] | OH number [mg KOH/g] |
|---|---|---|---|---|---|
| TMP × 1.2 PO | $K_2CO_3$ | 90 | 5907 2164 | 1810 | 300 |

TMP = trimethylolpropane
PO = propylene oxide

Component B2

TABLE 2

| | Monomer | Mn (g/mol) | Mw (g/mol) | OH number (mg KOH/g) | Acid number (mg KOH/g) |
|---|---|---|---|---|---|
| B 2 | Terephthalic acid and glycerol | 900 | 2390 | 416 | 0 |

Preparation of B2

1589 g (8.19 mol) of dimethyl terephthalate and 628 g (6.83 mol) of glycerol formed an initial charge in a 5 l glass flask equipped with stirrer, internal thermometer, gas inlet tube, reflux condenser, and vacuum connection with cold trap. 4.4 g of di-n-butyltin oxide commercially available as Fascat® 4201 were added and the mixture was heated with the aid of an oil bath to an internal temperature of 140° C. A reduced pressure of 50 mbar was applied in order to remove water formed during the reaction. The reaction mixture was held at the stated temperature and stated pressure for 34 hours. The mixture was then cooled to room temperature, giving 1750 g of hyperbranched polyester in the form of a clear, highly viscous liquid. The analytical data are given in table 2 above.

Inventive Example 1

881.8 g of DMT and 563.7 g of 1,4-butanediol were continuously fed into a reaction zone. 781.8 mg of tetrabutyl orthotitanate and 99 microliters of a 30% strength by weight solution of $NaOCH_3$ in methanol were continuously incorporated into the butanediol here by mixing, prior to contact with the DMT.

The temperature in the first reaction zone was 185° C. at a pressure of 1 bar with an average residence time of 182 min.

The temperature in the second reaction zone was 205° C. at a pressure of 1 bar with an average residence time of 63 min.

These polyester molding compositions can then also be blended with further additives, fillers, etc. to give other product compositions.

The temperature in the third reaction zone was 210° C. at a pressure of 1 bar with an average residence time of 40 min.

The distillate produced here, which comprised BDO, DMT, THF, and water, were separated in a column system, DMT and BDO being returned to the reaction. At 93% conversion, the transesterification product was passed to a vertical tube, divided into four heating zones.

The temperature in the fourth reaction zone was 247° C. at a pressure of 700 mbar, with an average residence time of 22 min.

The temperature in the fifth reaction zone was 252° C. at a pressure of 400 mbar, with an average residence time of 11 min.

The temperature in the sixth reaction zone was 255° C. at a pressure of 150 mbar, with an average residence time of 5 min.

The temperature in the seventh reaction zone was 256° C. at a pressure of 30 mbar, with an average residence time of 18 min.

The excess BDO and the reaction products, such as THF and water, were removed at the upper end of the reaction tube. The precondensate was transferred into a polycondensation reactor (zone 8) without further addition of catalysts.

The temperature in the eighth reaction zone was 257° C. at a pressure of 0.4 mbar, with an average residence time of 115 min and a surface renewal rate of 4 $m^2/h*kg$ PBT.

After discharge from the eighth reaction zone, the melt, at 257° C. (100% of final viscosity number) was treated by adding 1% by weight, based on A) and B), of component B2) in liquid form (T of feed line=80° C.).

Inventive Example 2

The method was based on example 1, but the amount of B2) added was 2% by weight, based on 100% by weight of A) and B).

Comparative Examples A and B

Components A) and B2) or B1) were compounded in the usual way, the component A) used comprising polybutylene terephthalate with a viscosity number VN of 130 ml/g and a carboxy end group content of 34 meq/kg (Ultradur® B4500 from BASF AG), VN measured in 0.5% strength by weight solution composed of phenol/o-dichlorobenzene, 1:1 mixture at 25° C.

Inventive Example 3

The method was based on inventive example 1, but 0.75% by weight of B1), based on 100% by weight of A) and B), was used at room temperature (RT).

Inventive Example 4

The method was based on inventive example 1, but 1% by weight of B1), based on 100% by weight of A) and B), was used at RT.

Processing to Give Moldings

The products obtained from the inventive examples and also from comparative examples A and B were injection molded to give the moldings needed for toughness tests. The melt temperature was 260° C. and the mold temperature was 80° C.

The following measurements were made:
Viscosity number was measured at 25° C. on a 0.5% solution of the polymer in a 1:1 mixture composed of phenol/o-dichlorobenzene (DIN 53728).
The tensile test was carried out to ISO 527-2 (with max. tensile stress and tensile strain at break) and the Charpy impact toughness to ISO 179-1eU.
The results of the tests are found in table 3.

TABLE 3

|  | Inv. ex. 1 | Inv. ex. 2 | Comp. A | Inv. ex. 3 | Inv. ex. 4 | Comp. B |
|---|---|---|---|---|---|---|
| VN [g/l] | 127 | 118 | 115 | 118 | 112 | 109 |
| MVR (275° C.; 2.16 kg) | 67 | 98 | 85 | 94 | 115 | 99 |
| Modulus of elasticity [mPa] | 2594 | 2543 | 2469 | 2604 | 2536 | 2581 |
| Tensile stress at max. [N/mm] | 72 | 64 | 58 | 61 | 57 | 58 |
| Notched Charpy [kJ/m$^2$] | 4.9 | 3.4 | 1.6 | 5.3 | 4.7 | 4.1 |
| Tensile strain at break [%] | 48.6 | 36.5 | 19.7 | 33.7 | 42.3 | 19.7 |
| Flow spiral, 260° C./80° C. 2 mm | 46 | 51 | 49 | 49 | 55 | 48 |

The invention claimed is:

1. A continuous process for preparation of polyalkylene arylates A) comprising hyperbranched polymers B) and, optionally, comprising lubricants C), by
esterifying or transesterifying an aromatic dicarboxylic acid or its ester or ester-forming derivatives, with a molar excess of an aliphatic dihydroxy compound, and
polycondensing the resultant transesterification or esterification product, which comprises, on achievement of at least 80% of a selected viscosity number, adding component B) and also, optionally, C) to the polymer melt of polyalkylene arylates A), wherein the amount of component B) added is from 0.01 to 10% by weight, based on 100% by weight of components A) to C), and, optionally,
post-condensing the melt and then discharging, cooling, and pelletizing it, and also using, as component B), at least one hyperbranched polycarbonate B1) with an OH number of from 1 to 600 mg KOH/g of polycarbonate (to DIN 53240, Part 2), or at least one hyperbranched polyester B2) of $A_xB_y$ type, where x is at least 1.1 and y is at least 2.1, or a mixture of these;
wherein the degree of branching for B1) and B2) is between 10 and 99.9%.

2. The process according to claim 1, wherein the amount of component B) added is from 0.1 to 10% by weight, based on 100% by weight of components A) to C).

3. The process according to claim 1, which uses a polyalkylene terephthalate.

4. The process according to claim 1, wherein, as lubricant, use is made of esters or amides of carboxylic acids having from 10 to 40 carbon atoms, or a mixture of these.

5. The process according to claim 1, which uses pentaerythritol tetrastearate as lubricant.

6. The process according to claim 1, wherein B) is suspended prior to addition to the melt, optionally at an elevated temperature, in the lubricant C).

7. The process according to claim 6, wherein the temperature at which the suspension is prepared for addition to the polymer melt is from 30 to 150° C.

8. The process according to claim 1, which uses, as component B1), a polycarbonate with a number-average molar mass $M_n$ of from 100 to 15 000 g/mol.

9. The process according to claim 1, which uses, as component B1), a polycarbonate with a glass transition temperature Tg of from −80 to 140° C.

10. The process according to claim 1, which uses, as component B1), a polycarbonate with a viscosity (mPas) at 23° C. of from 50 to 200 000 to DIN 53019.

11. The process according to claim 1, which uses, as component B2), a polyester with a number-average molar mass $M_n$ of from 300 to 30 000 g/mol.

12. The process according to claim 1, which uses, as component B2), a polyester with an OH number (to DIN 53 240) of from 0 to 600 mg KOH/g of polyester.

13. The process according to claim 1, which uses, as component B2), a polyester with a COOH number (to DIN 53 240) of from 0 to 600 mg KOH/g of polyester.

14. The process according to claim 1, which uses, as component B2), a polyester, where at least one OH number or one COOH number is greater than 0.

15. The process according to claim 2, which uses a polyalkylene terephthalate.

16. The process according to claim 2, wherein, as lubricant, use is made of esters or amides of carboxylic acids having from 10 to 40 carbon atoms, or a mixture of these.

17. The process according to claim 3, wherein, as lubricant, use is made of esters or amides of carboxylic acids having from 10 to 40 carbon atoms, or a mixture of these.

18. The process according to claim 2, which uses pentaerythritol tetrastearate as lubricant.

19. The process according to claim 3, which uses pentaerythritol tetrastearate as lubricant.

* * * * *